United States Patent
Li et al.

(10) Patent No.: US 10,678,830 B2
(45) Date of Patent: Jun. 9, 2020

(54) AUTOMATED COMPUTER TEXT CLASSIFICATION AND ROUTING USING ARTIFICIAL INTELLIGENCE TRANSFER LEARNING

(71) Applicant: FMR LLC, Boston, MA (US)

(72) Inventors: Pu Li, Dalian (CN); Chuanlu Yu, Dalian (CN); Hua Hao, Dalian (CN); Yu Zhang, Dalian (CN); Dong Han, Dalian (CN)

(73) Assignee: FMR LLC, Boston, MA (US)

( * ) Notice: Subject to any disclaimer, the term of this patent is extended or adjusted under 35 U.S.C. 154(b) by 217 days.

(21) Appl. No.: 15/994,278

(22) Filed: May 31, 2018

(65) Prior Publication Data
US 2019/0370394 A1   Dec. 5, 2019

(51) Int. Cl.
| | | |
|---|---|---|
| *G06F 16/35* | (2019.01) | |
| *G06N 3/04* | (2006.01) | |
| *G06F 17/16* | (2006.01) | |
| *G06N 3/08* | (2006.01) | |
| *G06F 16/31* | (2019.01) | |
| *G06F 16/335* | (2019.01) | |
| *G06F 16/33* | (2019.01) | |

(52) U.S. Cl.
CPC ............ *G06F 16/35* (2019.01); *G06F 16/313* (2019.01); *G06F 16/335* (2019.01); *G06F 16/3347* (2019.01); *G06F 17/16* (2013.01); *G06N 3/0454* (2013.01); *G06N 3/08* (2013.01)

(58) Field of Classification Search
CPC .................................. G06F 40/30; G06F 40/20
See application file for complete search history.

(56) References Cited

U.S. PATENT DOCUMENTS 9,635,181 B1   4/2017  McGann et al.
10,062,039 B1 *  8/2018  Lockett .................. G06N 20/00
(Continued)

FOREIGN PATENT DOCUMENTS

WO    WO-2019050968 A1 *  3/2019  ........... G06N 3/0445

OTHER PUBLICATIONS

Zhou, Chunting, et al. "A C-LSTM neural network for text classification." arXiv preprint arXiv:1511.08630 (2015).*
(Continued)

*Primary Examiner* — Matthew H Baker
(74) *Attorney, Agent, or Firm* — Proskauer Rose LLP

(57) ABSTRACT

Methods and apparatuses are described for automated computer text classification and routing using artificial intelligence transfer learning. A server trains a word embedding model using one-hot vectors of word pairs from a filtered first corpus of unstructured computer text and a filtered second corpus of unstructured computer text, using an artificial intelligence neural network. The server trains a long short-term memory model using vector matrices that correspond to sentences in the filtered second corpus of unstructured computer text, and labels. The server receives a message, generates a matrix for each sentence in the message by applying the trained word embedding model, generates one or more labels, and a probability for each label, for each sentence in the message by applying the trained long short-term memory model, and routes the message to a second client computing device based upon an assigned label.

18 Claims, 7 Drawing Sheets

(56) References Cited

U.S. PATENT DOCUMENTS

| | | | |
|---|---|---|---|
| 10,268,646 B2* | 4/2019 | Jaech | G06F 16/3334 |
| 2016/0247061 A1* | 8/2016 | Trask | G06N 3/02 |
| 2017/0024641 A1 | 1/2017 | Wierzynski | |
| 2017/0195487 A1 | 7/2017 | Bellosi et al. | |
| 2017/0286398 A1* | 10/2017 | Hunt | G06F 40/30 |
| 2019/0287685 A1* | 9/2019 | Wu | G06N 3/0481 |

OTHER PUBLICATIONS

Liu, Ning, et al. "Text representation: From vector to tensor." Fifth IEEE International Conference on Data Mining (ICDM'05). IEEE, 2005.*

Lai, Siwei, et al. "Recurrent convolutional neural networks for text classification." Twenty-ninth AAAI conference on artificial intelligence. 2015.*

* cited by examiner

AUTOMATED COMPUTER TEXT CLASSIFICATION AND ROUTING USING ARTIFICIAL INTELLIGENCE TRANSFER LEARNING

TECHNICAL FIELD

This application relates generally to methods and apparatuses, including computer program products, for automated computer text classification and routing using artificial intelligence transfer learning.

BACKGROUND

Recently, machine learning and artificial intelligence have seen a rise in prominence in a variety of different fields and for a number of specific applications, largely due to advances in computing technology that enables the implementation of advanced algorithms and techniques. One such area is information technology (IT) support/automated customer service, where client devices operated by customers communicate with IT systems of, e.g., a company to resolve problems and issues with the company's service. In one example, a customer may utilize his client device (e.g., desktop, laptop, mobile device) to submit an electronic problem ticket, consisting of computer text that describes the problem, to the IT system of a company's customer service center, where the problem ticket is automatically routed to a customer service system and/or representative for action.

Existing computing systems that analyze customer requests for routing to customer service agents or systems can leverage computing techniques such as natural language processing (NLP) and/or machine learning to automatically identify an issue or problem in the customer's submitted ticket and classify the ticket in the proper category—so that the ticket is correctly routed to a system or representative that can best address the problem. However, in order to have success using NLP and/or machine learning techniques in this way, the computing system that routes the electronic problem ticket must have a large corpus of historical data around submitted problem tickets, categorizations of those tickets, and routing decisions—so that the subsequent routing decisions made by the computing system are more accurate. Many routing systems do not have a sufficient amount of historical data for particular segments or business domains, in order to use NLP and machine learning effectively. For a machine learning system, a lot of training data is required—meaning for each ticket category, a machine learning system needs to collect hundreds, and perhaps thousands, of training data elements with a correct category label to be able to train a machine learning classification algorithm to classify a ticket based on the ticket description. But the reality is, most systems do not have enough training data, typically because there is not enough capacity to manually label all the data. Especially for some new business domains, there may be no historical training data.

SUMMARY

Therefore, what is needed are methods and systems that can leverage a large corpus of existing machine learning data in one subject matter domain to generate routing decision logic for a different subject matter domain. The technique of artificial intelligence transfer learning has recently attracted attention in the image processing area, in that an image classification computing system is capable of learning from activity in one domain and applying its knowledge to another domain. For example, the image classification computing system can analyze images of a dog to learn rules and features that enable it to identify dogs in subsequent images. In addition, the image classification computing system can then apply the knowledge obtained from analysis of the dog images to recognize and identify other animals (e.g., cats) in different images. Applying transfer learning in the context of computer text routing systems enables these systems to leverage the large corpus of historical data and machine learning knowledge that identifies text, classifies text, and performs text routing decisions in one subject matter domain to efficiently perform the same functions on computer text in an entirely different subject matter domain—without the necessity for a large amount of historical data in the latter domain. The techniques described herein advantageously enable computer text routing systems to dynamically adjust to different problems in a variety of subject matter areas—resulting in a faster, more efficient, more flexible text routing system.

The invention, in one aspect, features a system used in a computing environment in which unstructured computer text is analyzed for classification and routing using artificial intelligence transfer learning. The system comprises a computer data store including a first corpus of unstructured computer text associated with a first domain and a second corpus of unstructured computer text associated with a second domain. The system comprises a server computing device in communication with the computer data store. The server computing device is programmed to filter the first corpus of unstructured computer text and the second corpus of unstructured text using natural language processing. The server computing device is programmed to generate a first vocabulary data set based upon the filtered first corpus of unstructured computer text. The server computing device is programmed to generate a second vocabulary data set based upon the filtered second corpus of unstructured computer text. The server computing device is programmed to generate a one-hot vector for each word in the first vocabulary data set and the second vocabulary data set. The server computing device is programmed to train, using an artificial intelligence neural network executing on the server computing device, a word embedding model using the one-hot vectors of word pairs from the filtered first corpus of unstructured computer text and the filtered second corpus of unstructured computer text. The server computing device is programmed to create a multidimensional vector for each word in the filtered first corpus of unstructured computer text and the filtered second corpus of unstructured computer text using the trained word embedding model. The server computing device is programmed to build a 3D tensor for the filtered second corpus of unstructured computer text using the trained word embedding model, the 3D tensor comprising a plurality of matrices, where each matrix corresponds to a sentence in the filtered second corpus of unstructured computer text and each matrix comprises a plurality of vectors, each vector corresponding to a word in the sentence. The server computing device is programmed to apply one or more labels to the plurality of matrices in the 3D tensor. The server computing device is programmed to train, using a recurrent artificial intelligence neural network executing on the server computing device, a long short-term memory model using the plurality of matrices in the 3D tensor and the corresponding labels. The system comprises a first client computing device, in communication with the server computing device, that generates a message comprising one or more sentences of unstructured computer text associated with the second domain. The server computing device is programmed to filter the unstructured computer text in the message using natural language processing. The server computing device is programmed to generate a matrix for each sentence in the unstructured computer text in the message by applying the trained word embedding model to each word in the sentence. The server computing device is programmed to identify one or more labels, and a probability for each label, for each sentence in the unstructured computer text in the message by applying the trained long short-term memory model to the generated matrix for each sentence. The server computing device is programmed to assign a label having a highest probability to each sentence in the unstructured computer text. The server computing device is programmed to route the message to a second client computing device based upon the assigned label.

The invention, in another aspect, features a computerized method in which unstructured computer text is analyzed for classification and routing using artificial intelligence transfer learning. A computer data store stores a first corpus of unstructured computer text associated with a first domain and a second corpus of unstructured computer text associated with a second domain. A server computing device in communication with the computer data store filters the first corpus of unstructured computer text and the second corpus of unstructured text using natural language processing. The server computing device generates a first vocabulary data set based upon the filtered first corpus of unstructured computer text. The server computing device generates a second vocabulary data set based upon the filtered second corpus of unstructured computer text. The server computing device generates a one-hot vector for each word in the first vocabulary data set and the second vocabulary data set. The server computing device trains, using an artificial intelligence neural network executing on the server computing device, a word embedding model using the one-hot vectors of word pairs from the filtered first corpus of unstructured computer text and the filtered second corpus of unstructured computer text. The server computing device creates a multidimensional vector for each word in the filtered first corpus of unstructured computer text and the filtered second corpus of unstructured computer text using the trained word embedding model. The server computing device builds a 3D tensor for the filtered second corpus of unstructured computer text using the trained word embedding model, the 3D tensor comprising a plurality of matrices, where each matrix corresponds to a sentence in the filtered second corpus of unstructured computer text and each matrix comprises a plurality of vectors, each vector corresponding to a word in the sentence. The server computing device applies one or more labels to the plurality of matrices in the 3D tensor. The server computing device trains, using a recurrent artificial intelligence neural network executing on the server computing device, a long short-term memory model using the plurality of matrices in the 3D tensor and the corresponding labels. The server computing device receives a message comprising one or more sentences of unstructured computer text associated with the second domain from a first client computing device. The server computing device filters the unstructured computer text in the message using natural language processing. The server computing device generates a matrix for each sentence in the unstructured computer text in the message by applying the trained word embedding model to each word in the sentence. The server computing device identify one or more labels, and a probability for each label, for each sentence in the unstructured computer text in the message by applying the trained long short-term memory model to the generated matrix for each sentence. The server computing device assigns a label having a highest probability to each sentence in the unstructured computer text. The server computing device routes the message to a second client computing device based upon the assigned label.

Any of the above aspects can include one or more of the following features. In some embodiments, filtering the first corpus of unstructured computer text and the second corpus of unstructured text using natural language processing comprises one or more of: (i) removing stopwords from the first corpus of unstructured computer text and the second corpus of unstructured text, (ii) lemmatizing the first corpus of unstructured computer text and the second corpus of unstructured text, or (iii) removing one or more symbols or digits from the first corpus of unstructured computer text and the second corpus of unstructured text. In some embodiments, the first corpus of unstructured computer text and the second corpus of unstructured computer text are input into the computer data store via a web page, input directly into the computer data store via a first computer file, input into the computer data store via a data feed, or any combination thereof.

In some embodiments, generating a first vocabulary data set based upon the filtered first corpus of unstructured computer text comprises, for each word in the filtered first corpus of unstructured computer text: determining a number of times that the word appears in the filtered first corpus of unstructured computer text, and adding the word to a first vocabulary data set if the number of times that the word appears in the filtered first corpus of unstructured computer text is above a predetermined threshold. In some embodiments, generating a second vocabulary data set based upon the filtered second corpus of unstructured computer text comprises, for each word in the filtered second corpus of unstructured computer text: determining a number of times that the word appears in the filtered second corpus of unstructured computer text; and adding the word to a second vocabulary data set if the number of times that the word appears in the filtered second corpus of unstructured computer text is above a predetermined threshold.

In some embodiments, the artificial intelligence neural network that trains the word embedding model comprises a shallow neural network having an input layer, a hidden layer, and an output layer. In some embodiments, the first corpus of unstructured computer text associated with the first domain is larger than the second corpus of unstructured computer text associated with the second domain. In some embodiments, the one or more labels comprise one or more sublabels. In some embodiments, a subject matter of the first domain is different than a subject matter of the second domain.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
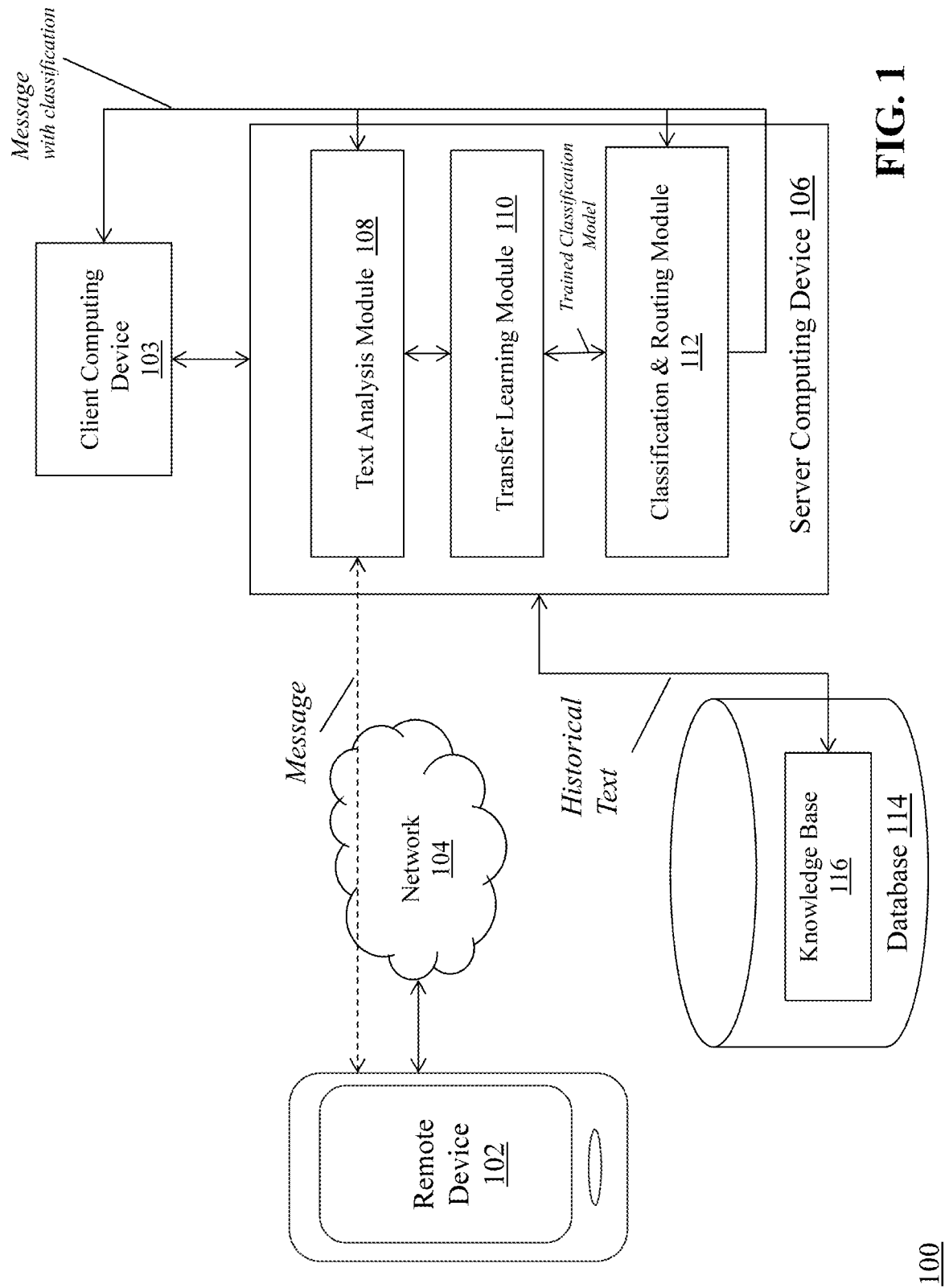
FIG. 1 is a block diagram of a system for automated computer text classification and routing using artificial intelligence transfer learning.

FIG. 1 is a block diagram of a system 100 for automated computer text classification and routing using artificial intelligence transfer learning. The system 100 includes a remote device 102, a client computing device 103, a communications network 104, a server computing device 106 that includes a text analysis module 108, an artificial intelligence transfer learning module 108, and a classification and routing module 112, and a database 114 that includes a knowledge base 116.

The remote device 102 connects to the communications network 104 in order to communicate with the server computing device 106 to provide input and receive output relating to the process of automated computer text classification and routing using artificial intelligence transfer learning as described herein. The remote device 102 is coupled to a display device (not shown). For example, remote device 102 can provide a graphical user interface (GUI) via the display device that presents output resulting from the methods and systems described herein.

Exemplary remote devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single remote device 102, it should be appreciated that the system 100 can include any number of remote devices.

The client computing device 103 is a computing device coupled to the server computing device 106 and used to execute software applications in response to messages originating at the remote device 102. In one example, the client computing device 103 is a workstation (e.g., desktop computer) of a customer service agent in a call center that enables the agent to receive messages, access information and perform actions using software on the client device 103 to provide responses and/or solutions to messages submitted by the remote device 102. The client device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent.

The communications network 104 enables the remote device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 a device including specialized hardware and/or software modules that execute on a processor and interact with memory modules of the server computing device 106, to receive data from other components of the system 100, transmit data to other components of the system 100, and perform functions for automated computer text classification and routing using artificial intelligence transfer learning as described herein. The server computing device 106 includes several computing modules 108, 110, 112 that execute on the processor of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

The database 114 is a computing device (or in some embodiments, a set of computing devices) coupled to the server computing device 106 and is configured to receive, generate, and store specific segments of data relating to the process of automated computer text classification and routing using artificial intelligence transfer learning as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 208 is MySQL™ available from Oracle Corp. of Redwood City, Calif.

The database 114 includes a knowledge base 116 which is a dedicated section of the database 114 that contains specialized data used by the other components of the system 110 to perform the automated computer text classification and routing using artificial intelligence transfer learning as described herein. Further detail on the knowledge base 114 is provided below.

Figure 2A:
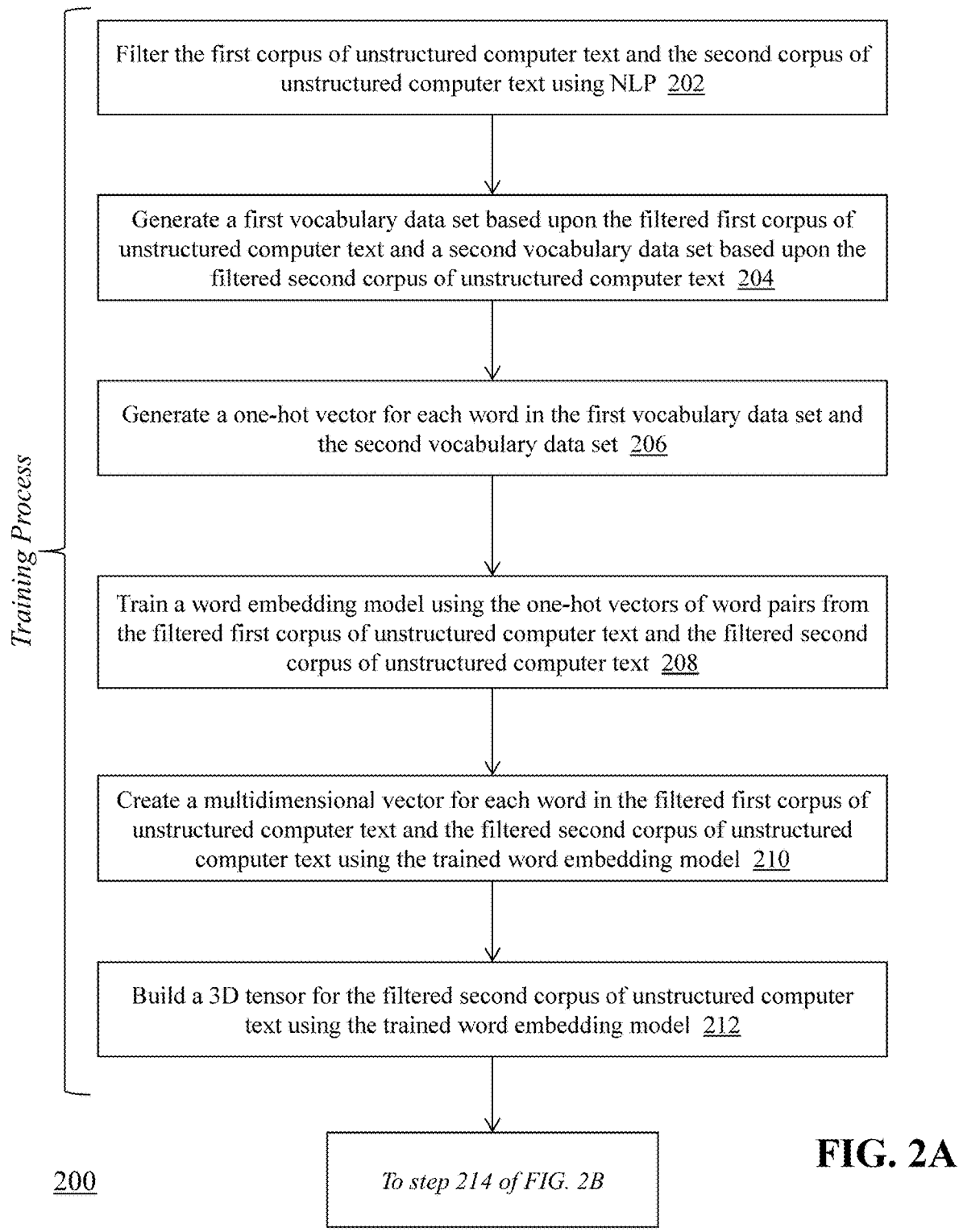
FIGS. 2A and 2B comprise a flow diagram of a method for automated computer text classification and routing using artificial intelligence transfer learning.
Figure 2B:
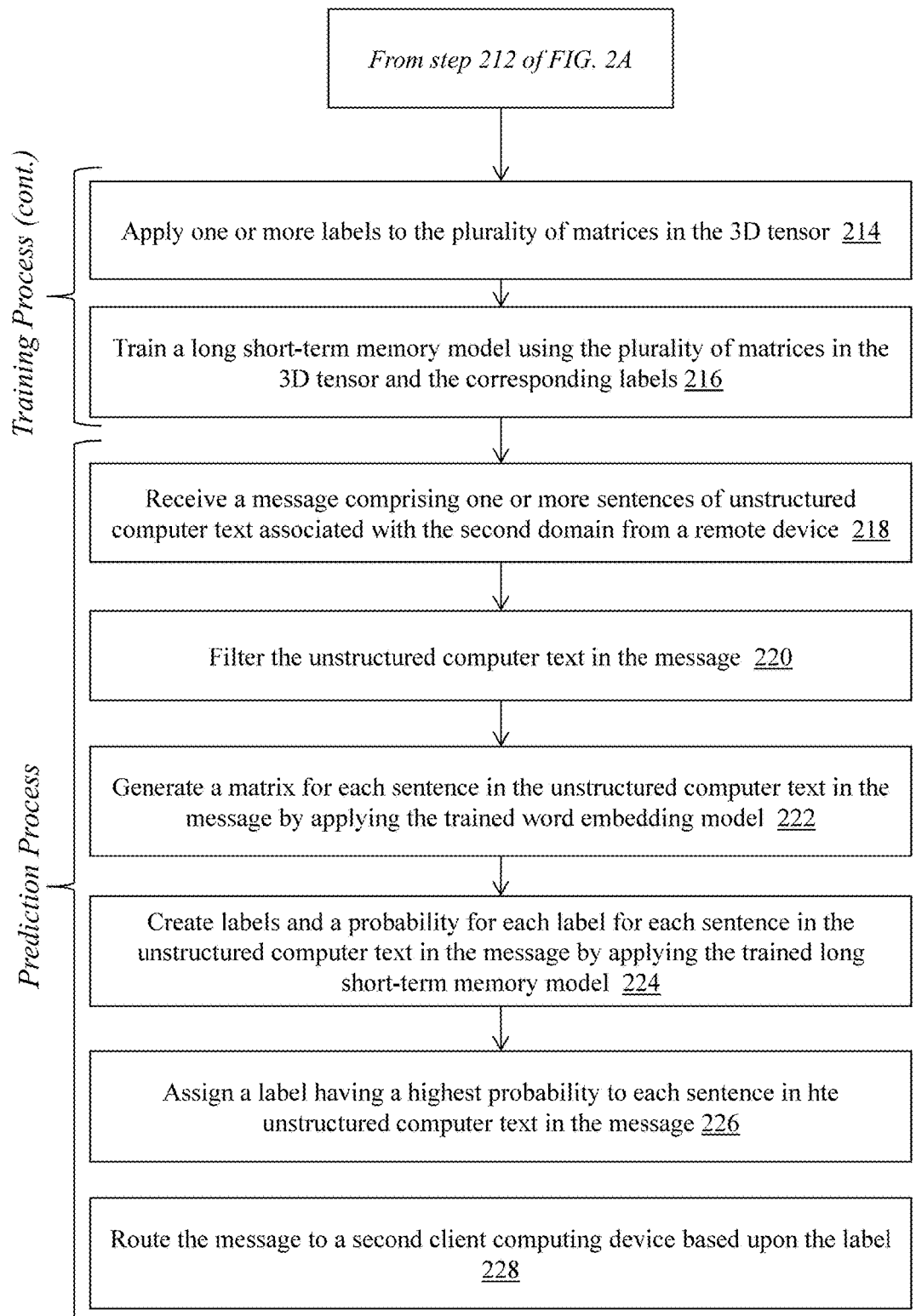

FIGS. 2A and 2B are a flow diagram of a method 200 for automated computer text classification and routing using artificial intelligence transfer learning, using the system 100 of FIG. 1. The first phase of the method 200 comprises a training process (i.e. steps 202-216), whereby the server computing device 106 generates and trains data classification models by applying artificial intelligence techniques to historical unstructured text data stored in the knowledge base 116, and the models are subsequently employed by the server computing device 106 in a prediction process (i.e. steps 218-228) to classify incoming unstructured text in a message received from remote device 102, apply a label to the unstructured text, and route the message to, e.g., client computing device 103 for action.

Figure 3:
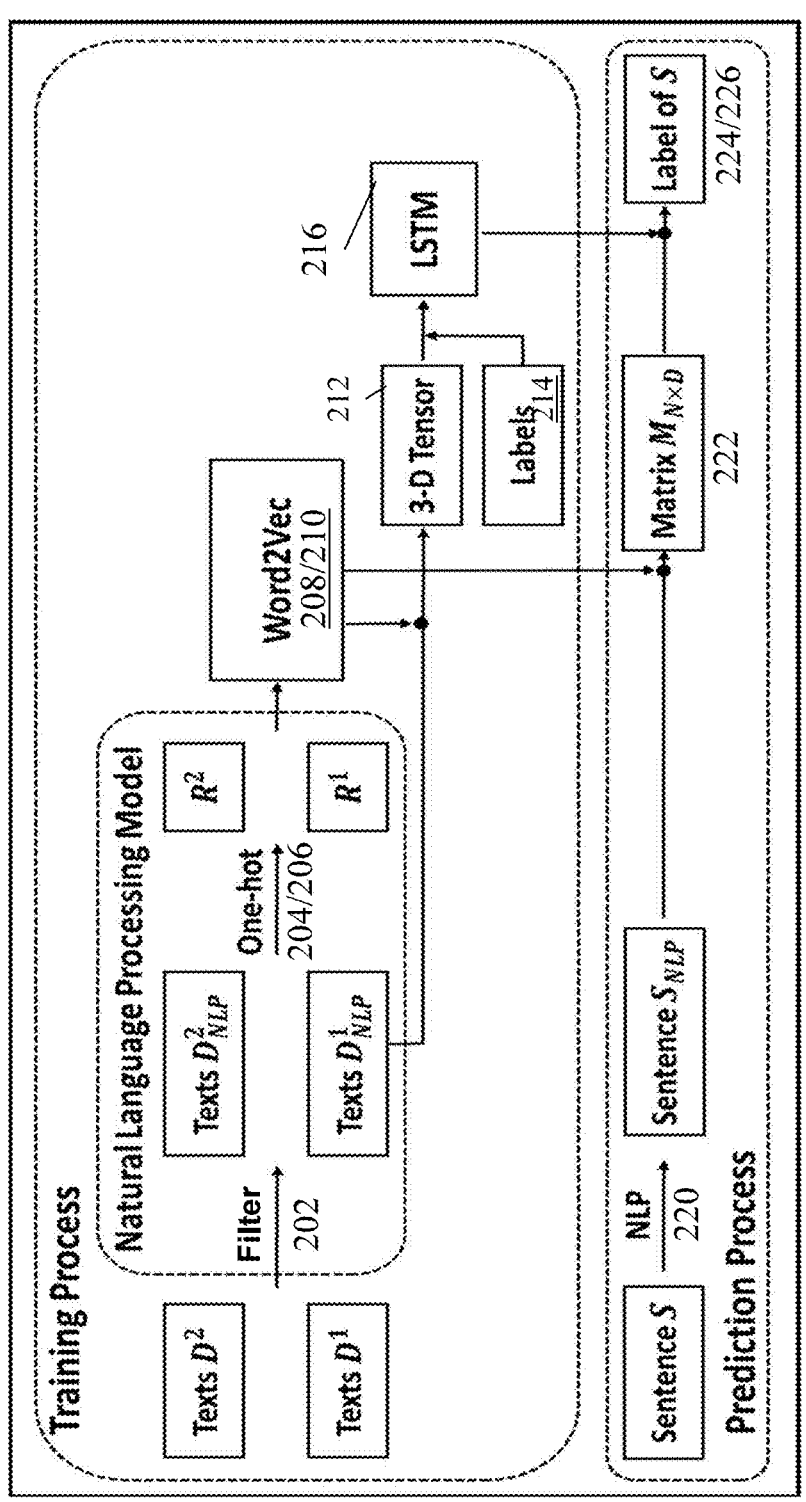
FIG. 3 is a detailed block diagram of the training process and the prediction process.

FIG. 3 is a detailed block diagram of the training process and the prediction process as conducted by the modules 108, 110, 112 of server computing device 106 shown in FIG. 1 and using the method 200 shown in FIGS. 2A and 2B. The training process starts when the text analysis module 108 receives unstructured computer text data (Texts $D^1$ and $D^2$) from the knowledge base 116 of database 114. The unstructured computer text data comprises two different corpuses of text: corpus $D^1$ is the unstructured computer text (i.e., sentences made up of words) from the specific subject matter domain for which there is a lack of sufficient historical data to train the artificial intelligence models, while corpus $D^2$ is the unstructured computer text from a different subject matter domain (or multiple different domains) that does have sufficient historical data to train the artificial intelligence models. In some examples, the corpus D2 can include unstructured computer text obtained from one or more external sources—such as IMDB (available at https://www.kaggle.com/c/sentiment-analysis-on-movie-reviews/data) and/or Wikimedia (available at https://dumps.wikimedia.org/).

The text analysis module 108 filters (202) the corpus of unstructured computer text $D^1$ and the corpus of unstructured computer text $D^2$ using natural language processing (NLP) techniques. Generally, NLP is a technology in artificial intelligence data processing to accommodate interactions between human and machine. NLP consists of two aspects: natural language understanding and natural language generation. Natural language understanding relates to configuring computing devices to analyze information in unstructured text (or speech), and to provide an algorithmic decision or conclusion based upon the analyzed information. In NLP, unstructured text is typically transformed into a mathematical form or representation (such as vector or a matrix) so that a computing device can efficiently process the data.

In one embodiment, the text analysis module 108 preprocesses $D^1$ and $D^2$ to remove extraneous information in the text corpus that does not relate to the substance of the textual content, such as certain symbols and digits (e.g., slashes (/), dashes (-), carrots (^), etc.). The text analysis module 108 also lemmatizes the unstructured text in $D^1$ and $D^2$—meaning that the module 108 groups together the inflected forms of a word. The text analysis module 108 can also apply a stopword mask to $D^1$ and $D^2$ in order to remove common words that may be of little value in determining the content and context of the unstructured text. The goal of the text analysis module in the filtering step is to retain important and descriptive words in the text corpuses, and eliminate useless words and other noise in the text. The text analysis module 108 generates filtered corpuses of text for to $D^1$ and $D^2$, which are shown in FIG. 3 as $D_{NLP}^1$ and $D_{NLP}^2$.

Next, the text analysis module 108 generates (204) a first vocabulary data set based upon the filtered corpus of unstructured computer text $D_{NLP}^1$ and generates a second vocabulary data set based upon the filtered corpus of unstructured computer text $D_{NLP}^2$. Generally, the vocabulary sets comprise a plurality of words extracted from the corpuses $D_{NLP}^1$ and $D_{NLP}^2$ that have particular significance or relevance to the respective corpus. In one embodiment, to generate the vocabulary set for each corpus, the text analysis module 108 determines a number of times that a word appears in the corpus, and adds the word to the corresponding vocabulary data set for the corpus if the number of times that the word appears in corpus is above a predetermined threshold. For example, if the word 'activate' (or its related forms, 'activating', 'activation') appears in the corpus more than ten times, the text analysis module 108 can capture the word 'activate' and add it to the vocabulary data set.

Once the text analysis module 108 has generated the vocabulary data set for each corpus $D_{NLP}^1$ and $N_{NLP}^2$, the module 108 applies a one-hot encoder to each vocabulary data set to generate (206) a one-hot vector for each word in the respective vocabulary data sets. In a one-hot vector, the value for the corresponding word is 1 and the value for the other words in the vocabulary data set is 0. For example, if the vocabulary data set comprises the words (activate, phone, access, device, setup), the corresponding one-hot vectors for those words would be:

| Word | One-hot Vector |
| --- | --- |
| activate | (1, 0, 0, 0, 0) |
| phone | (0, 1, 0, 0, 0) |
| access | (0, 0, 1, 0, 0) |
| device | (0, 0, 0, 1, 0) |
| setup | (0, 0, 0, 0, 1) |

As shown in FIG. 3, the text analysis module 108 produces a set of one-hot vectors ($R^1$ and $R^2$) that comprises the one-hot vectors for the words in the corresponding corpuses $D_{NLP}^1$ and $D_{NLP}^2$.

The transfer learning module 110 of server computing device 106 then receives the one-hot vectors from the text analysis module 108, and the transfer learning module 110 executes an artificial intelligence neural network to train (208) a word embedding model using the one-hot vectors $R^1$ and $R^2$ of word pairs from the respective corpuses $D_{NLP}^1$ and $D_{NLP}^2$. As we know, each word in the corpuses has its context, such as 'This is an efficient method for learning discriminative word representation'. For the word 'learning', if we set the context window to three, this means the three words in the left (efficient, method, for) and the three words in the right (discriminative, word, representation) are the context of 'learning' Then the word 'learning' and its context words are in a group, and from the corpuses we can get many groups. A shallow neural network is trained based on these groups. Each middle position word in the group (such as 'learning') will be the output, and the context words of this word are the input of the network. At beginning, all the words are represented by a random vector, here we use one-hot vector. The target of this network is to maximize the probability of output as the middle position word ('learning') when the input is context words (efficient, method, for, discriminative, word, representation). In one embodiment, the artificial intelligence neural network used by the transfer learning module 110 to train the word embedding model is a shallow neural network having an input layer, a hidden layer, and an output layer. The transfer learning module 110 uses the neural network to insert the one-hot vectors in a high-dimensional vector space (e.g., several hundreds or thousands of dimensions). The neural network positions the vectors in the high-dimensional vector space such that words that share common contexts in the unstructured computer text are located in close proximity to one another. An exemplary algorithm that can be used in this neural network is Word2vec (available from http://deeplearning4j.org/word2vec). Once trained, the word embedding model is used to create (210) a multidimensional vector for each word in the corpuses $D_{NLP}^1$ and $N_{NLP}^2$.

Figure 4:
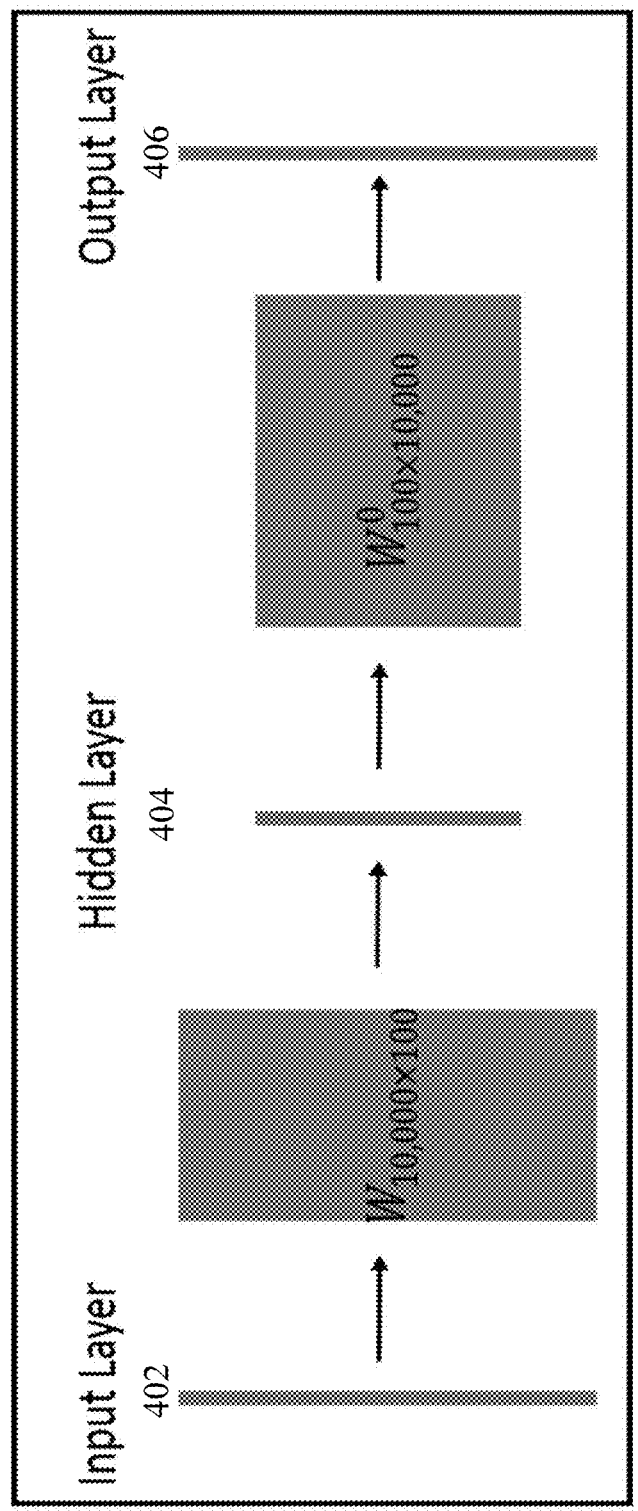
FIG. 4 is a diagram of an exemplary neural network framework used by the transfer learning module to train the word embedding model and generate a multidimensional vector.

FIG. 4 is a diagram of an exemplary neural network framework used by the transfer learning module 110 to train the word embedding model and generate a multidimensional vector for each word in the corpuses $D_{NLP}{}^1$ and $D_{NLP}{}^2$. In one example, two words may have similar semantics, then their contexts will likely be also similar. As a result, their multidimensional vector will be also similar. In this example, the transfer learning module 110 constructs the neural network using a window size of 5 (meaning the number of words around the input word that are analyzed by the network) and the number of nodes in the hidden layer 404 of the network is 100. This means that the transfer learning module 110 can use the neural network to represent a word with 100 topics or facets. In other words, each word can be represented as a 100-dimensional vector.

As shown in FIG. 4, the neural network includes an input layer 402 which comprises one or more words each represented as a one-hot vector. The output layer 406 of the neural network comprises a single vector that has similar dimensions to the input one-hot vector, where each component of the output vector is a probability that a randomly selected nearby word is the vocabulary word used as input. In this example, the text analysis module 108 can build a vocabulary that contains, e.g., 10,000 words based on the corpuses $D_{NLP}{}^1$ and $D_{NLP}{}^2$ and represent the input words using one-hot vectors. In one embodiment, the word embedding model is trained by back propagation. For Word2vec, the goal is just to learn the hidden layer's 104 weight matrix $W_{10,000 \times 100}$. The transfer learning module 110 discards the output layer after training, and 100 is used as an exemplary value for the number of topics learned from the training data. So $W_{10,000 \times 100}$ provides a lookup table structure where the transfer learning module 110 determines a word vector for each word in the vocabulary data set. In one example, for i-th word in the vocabulary, the i-th row of the hidden layer weight matrix is the corresponding word vector. Take $W_{10,000 \times 100}$ for example, $$W_{10,000 \times 100} = \begin{bmatrix} w_{0,0} & \cdots & w_{0,99} \\ \vdots & \ddots & \vdots \\ w_{9,999,0} & \cdots & w_{9,999,99} \end{bmatrix},$$

where $w_{i,j}$, $i=0, \ldots, 9,999$; $j=0, \ldots, 99$ is a real number, and each row of W maps to a word. Such as word 'network' maps to the $21^{st}$ row, then the word vector of 'network' is $[w_{20,0}, w_{20,1}, w_{20,2}, \ldots, w_{20,99}]$.

Based on the trained word embedding model, each word in the corpus $D_{NLP}{}^1$ can now be represented as a multidimensional vector, and therefore each sentence in the corpus $N_{NLP}{}^1$ can now be represented as a matrix of multidimensional vectors. Accordingly, assuming the corpus $D_{NLP}{}^1$ comprises multiple sentences, a plurality of sentences can now be represented as a 3D tensor with the matrices of the corresponding sentences.

Turning back to FIG. 3, the transfer learning module 110 of server computing device 106 builds (212) a 3D tensor for the corpus $D_{NLP}{}^1$ (that is, the corpus of text from the specific subject matter domain for which there is a lack of sufficient historical data to train the artificial intelligence models) using the trained word embedding model. In this context, tensor means a stack of matrices. For example, the transfer learning module 106 passes each word from a sentence into the trained word embedding model to generate a multidimensional vector for the word, aggregates the multidimensional vectors from each word into a matrix of vectors, and aggregates the matrices from multiple sentences into the 3D tensor data structure. The transfer learning module 106 also applies (214) one or more labels to each of the plurality of matrices in the 3D tensor.

Figure 5:
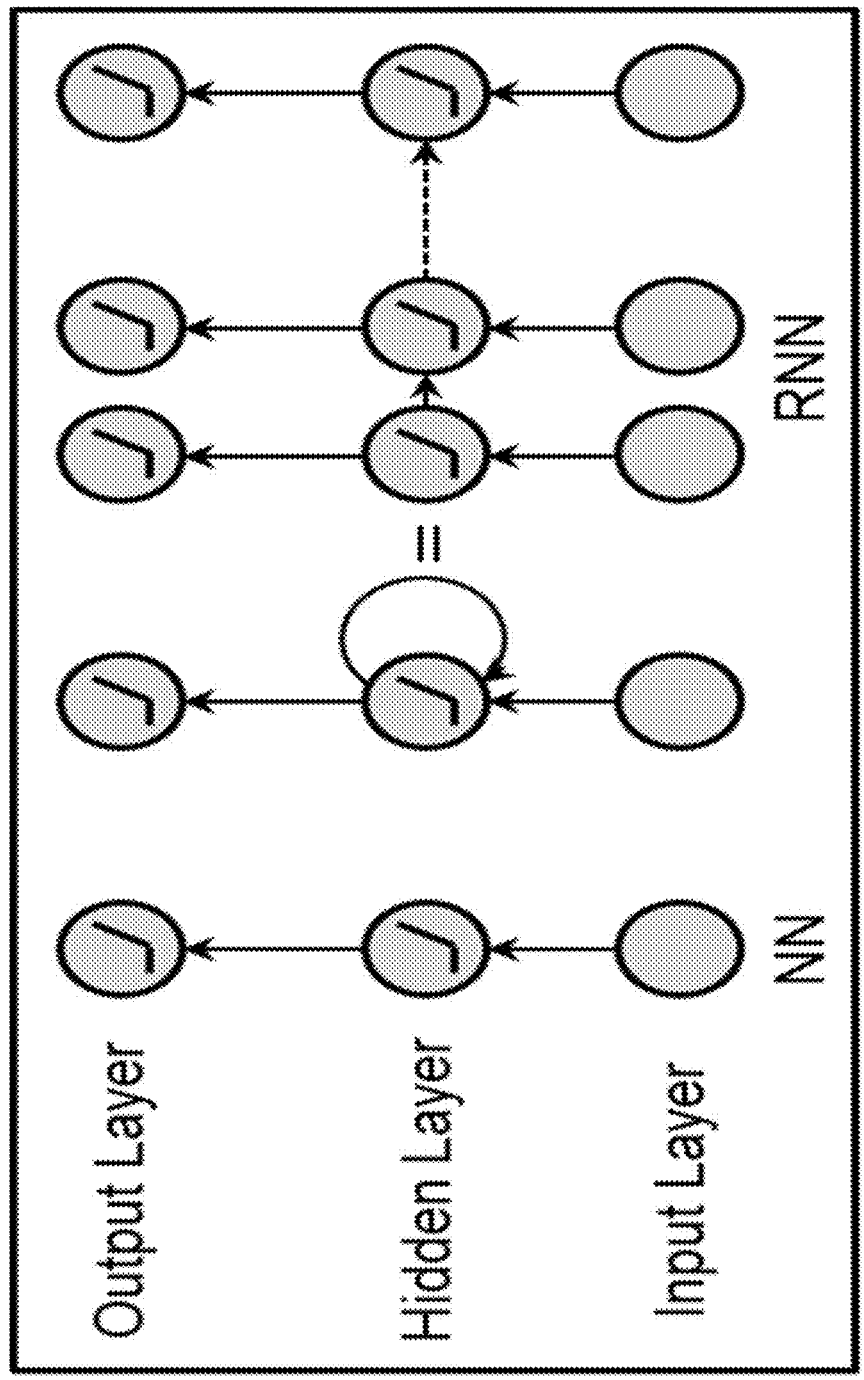
FIG. 5 is an exemplary recursive neural network.

Once the transfer learning module 106 has built the 3D tensor with corresponding labels, the transfer learning module 106 executes a recursive artificial intelligence neural network to train (216) a long short-term memory (LSTM) model using the plurality of matrices in the 3D tensor along with the corresponding labels. Generally, LSTM is a branch of recurrent neural networks (RNN), which was proposed by Hochreiter and Schmidhuber in 1997 and improved by Alex Graves in 2012. The recursive neural network incorporates loops in its hidden layer, as shown in FIG. 5. The incorporation of loops enables the neural network to include information over time.

However, one drawback of RNN is that the influence of a given input on the hidden layers decays exponentially as it loops. This problem is called the 'vanishing gradient' problem, which is the main obstacle for deepening the neural network architecture, as described in Pascanu et al., "On the difficulty of training recurrent neural networks," *Proceedings of the $30^{th}$ International Conference on Machine Learning*, Atlanta, Ga. (2013) and Hochreiter, S., "The Vanishing Gradient Problem During Learning Recurrent Neural Nets and Problem Solutions," Institut für Informatik, Technische Universität München, Oct. 20, 1997. Hinton et. al. used ReLU to solve this problem in the depth of the space in Convolutional Neural Networks (CNN), and Long Short-Term Memory (LSTM) using the memory blocks to clear the obstacle in the depth of time in RNN. An exemplary LSTM architecture with memory in the hidden layer is illustrated in FIG. 6.

Figure 6:
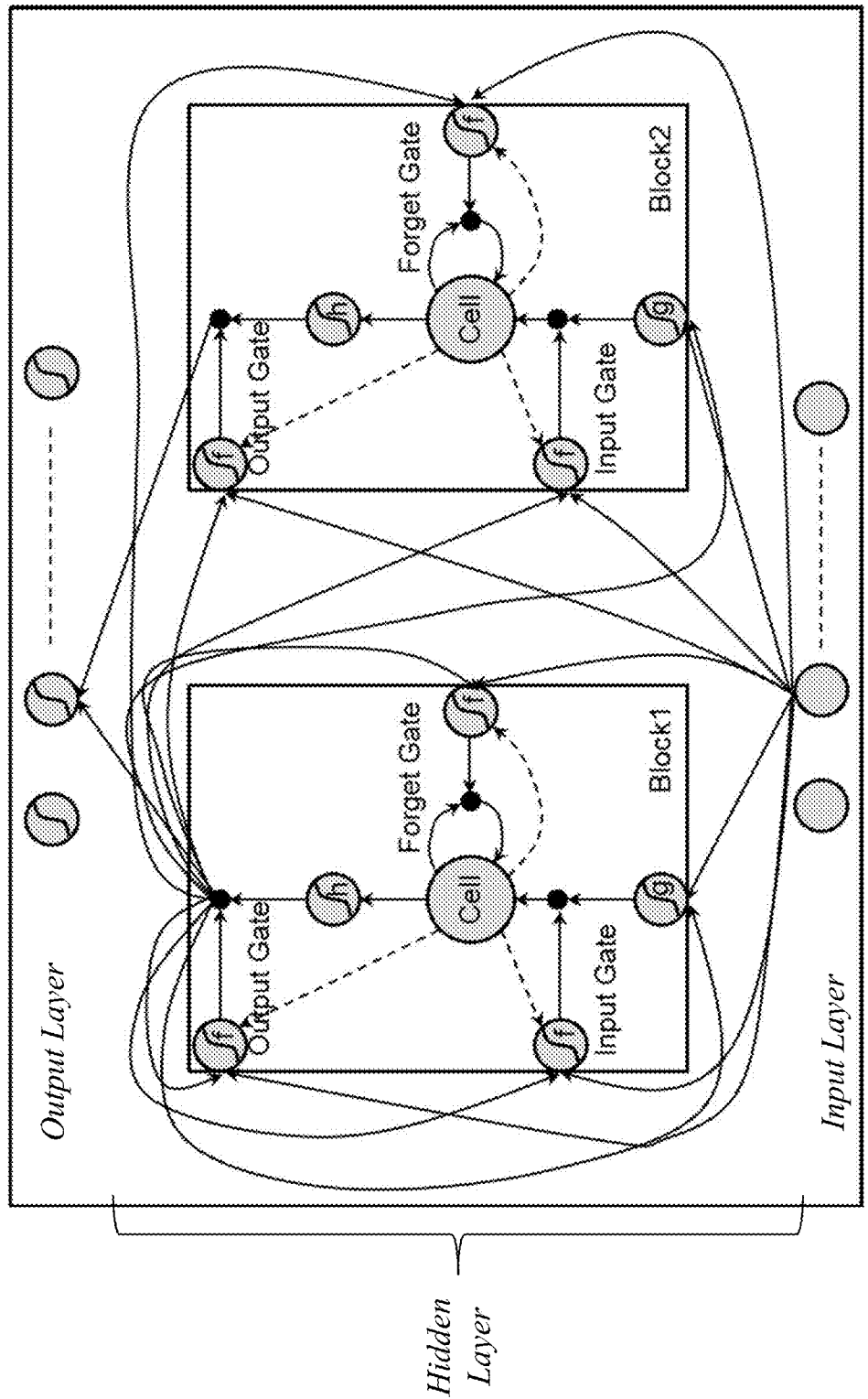
FIG. 6 is an exemplary long short-term memory (LSTM) model architecture with memory in the hidden layer.

LSTM adds input, output and forget gates, shown in FIG. 6, to build the memory block and these three gates capture the activations from inside and outside the memory block. The small circles represent the multiplication, and the forget gate multiplies the previous state of the cell while the other two gates multiply the input or output of the cell. The input and output gate activation function always utilize the sigmoid function, which ensures that the activations E [0,1]. The input and output function of the cell are usually tan h or sigmoid function. The dashed lines represent the weighted connections between the cell and the three gates. The outputs of the memory block are the multiplication of the output gate and the output of the cell.

Turning back to FIG. 3, as mentioned above, each sentence matrix (or vector sequences) is an input of the LSTM neural network. Because different sentences may contain a different number of words, the lengths of the vector matrices for each sentence may be different. The transfer learning module 110 completes each of the vector matrices with zero vectors, so that the matrices have equal length. The LSTM neural network used by the transfer learning module 110 comprises two hidden layers with 1,300 nodes in each layer and the dropout rate is 0.2—which is used to avoid overfitting—as explained in N. Srivastava et al., "Dropout: A Simple Way to Prevent Neural Networks from Overfitting," Journal of Machine Learning Research 15 (2014) 1929-1958. The output from the LSTM represents high-level features of the input sentence. The purpose of the fully-connected layer is to use these features for classifying the input sentence into various classes based on the training data. After these is a fully-connected layer with softmax activation.

Once the transfer learning module 110 has trained the LSTM model, the system 100 is ready to shift into the prediction process, to incoming unstructured computer text (e.g., contained in messages from remote device 102 operated by a user) in order to classify the text with one or more labels, and route the message to a computing system that is capable of handling the message. Turning back to FIG. 2B, the text analysis module 108 receives (218) a message comprising one or more sentences of unstructured computer text associated with a particular subject matter domain, from remote device 102. For example, a user may log on to a website operated by the server computing device 106 and provide a problem description in an online form that includes sentence S (e.g., 'I need to activate my mobile device and access the settings.'). The remote device 102 can convert the problem description into a message containing the sentence S and transmit the message to the server computing device 106, for routing to a customer service representative at client computing device 103.

The text analysis module 108 filters (220) the unstructured computer text in the message (i.e. Sentence S) received from the remote device 102, using NLP techniques described above with respect to step 202 of FIG. 2A, to generate a filtered Sentence $S_{NLP}$. If the message contains multiple sentences, the text analysis module 108 can perform the same filtering step for each sentence. The text analysis module 108 passes the filtered sentences (i.e. Sentence $S_{NLP}$) to the classification and routing module 112 of server computing device 106.

The classification and routing module 112 generates (222) a matrix for each sentence in the unstructured computer text by applying the trained word embedding model. As described previously with respect to the transfer learning module 110, the classification and routing module 112 can represent Sentence $S_{NLP}$ as matrix $M_{N \times D}$, where N is the number of words in the sentence and D is the number of dimensions returned from the output layer of the trained word embedding model (e.g., 100). The classification and routing module 112 can use the matrix M as input to the trained LSTM model to identify (224) one or more labels, and a probability for each label, for each sentence. In this context, the labels can be a value that corresponds to a particular routing scheme or category—the labels may be based on any number of different criteria, such as domain, subject matter, service center, and the like. In addition, in some embodiments, the labels can include one or more sublabels to further refine the routing procedure.

The output from the LSTM model can also include a probability associated with each label, that indicates the likelihood that the label is correct and/or most applicable to the sentence, based upon the transfer learning techniques described herein. In some embodiments, the label with the highest probability indicates the label that should be assigned to the sentence. The classification and routing module 112 assigns (226) the label having the highest probability to each sentence in the message.

Then, the classification and routing module 112 routes (228) the message based upon the assigned label. In one embodiment, the module 112 can match the assigned label (or labels) to a lookup table in database 114 to determine one or more routing addresses, routing rules, or the like that indicate to which computing system or resource the message should be delivered. For example, the database 114 can include IP addresses, email addresses, MAC addresses, or other identifiers that are associated with a particular computing device (e.g., device 103). The classification and routing module 112 can use the information to transmit the message to the appropriate destination for service.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for classification and routing using artificial intelligence transfer learning, the system comprising:
   a computer data store including a first corpus of unstructured computer text associated with a first domain and a second corpus of unstructured computer text associated with a second domain;
   a server computing device in communication with the computer data store, the server computing device programmed to:
   filter the first corpus of unstructured computer text and the second corpus of unstructured text using natural language processing;
   generate a first vocabulary data set based upon the filtered first corpus of unstructured computer text;
   generate a second vocabulary data set based upon the filtered second corpus of unstructured computer text;
   generate a one-hot vector for each word in the first vocabulary data set and the second vocabulary data set;
   train, using an artificial intelligence neural network executing on the server computing device, a word embedding model using the one-hot vectors of word pairs from the filtered first corpus of unstructured computer text and the filtered second corpus of unstructured computer text;
   create a multidimensional vector for each word in the filtered first corpus of unstructured computer text and the filtered second corpus of unstructured computer text using the trained word embedding model;
   build a 3D tensor for the filtered second corpus of unstructured computer text using the trained word embedding model, the 3D tensor comprising a plurality of matrices, wherein each matrix corresponds to a sentence in the filtered second corpus of unstructured computer text and each matrix comprises a plurality of vectors, each vector corresponding to a word in the sentence;
   apply one or more labels to the plurality of matrices in the 3D tensor;
   train, using a recurrent artificial intelligence neural network executing on the server computing device, a long short-term memory model using the plurality of matrices in the 3D tensor and the corresponding labels; and
   a first client computing device, in communication with the server computing device, that generates a message comprising one or more sentences of unstructured computer text associated with the second domain;

wherein the server computing device:
    filters the unstructured computer text in the message using natural language processing;
    generates a matrix for each sentence in the unstructured computer text in the message by applying the trained word embedding model to each word in the sentence;
    identifies one or more labels, and a probability for each label, for each sentence in the unstructured computer text in the message by applying the trained long short-term memory model to the generated matrix for each sentence;
    assigns a label having a highest probability to each sentence in the unstructured computer text; and
    routes the message to a second client computing device based upon the assigned label.

2. The system of claim 1, wherein filtering the first corpus of unstructured computer text and the second corpus of unstructured text using natural language processing comprises one or more of: (i) removing stopwords from the first corpus of unstructured computer text and the second corpus of unstructured text, (ii) lemmatizing the first corpus of unstructured computer text and the second corpus of unstructured text, or (iii) removing one or more symbols or digits from the first corpus of unstructured computer text and the second corpus of unstructured text.

3. The system of claim 1, wherein the first corpus of unstructured computer text and the second corpus of unstructured computer text are input into the computer data store via a web page, input directly into the computer data store via a first computer file, input into the computer data store via a data feed, or any combination thereof.

4. The system of claim 1, wherein generating a first vocabulary data set based upon the filtered first corpus of unstructured computer text comprises, for each word in the filtered first corpus of unstructured computer text:
    determining a number of times that the word appears in the filtered first corpus of unstructured computer text, and
    adding the word to a first vocabulary data set if the number of times that the word appears in the filtered first corpus of unstructured computer text is above a predetermined threshold.

5. The system of claim 1, wherein generating a second vocabulary data set based upon the filtered second corpus of unstructured computer text comprises, for each word in the filtered second corpus of unstructured computer text:
    determining a number of times that the word appears in the filtered second corpus of unstructured computer text; and
    adding the word to a second vocabulary data set if the number of times that the word appears in the filtered second corpus of unstructured computer text is above a predetermined threshold.

6. The system of claim 1, wherein the artificial intelligence neural network that trains the word embedding model comprises a shallow neural network having an input layer, a hidden layer, and an output layer.

7. The system of claim 1, wherein the first corpus of unstructured computer text associated with the first domain is larger than the second corpus of unstructured computer text associated with the second domain.

8. The system of claim 1, wherein the one or more labels comprise one or more sublabels.

9. The system of claim 1, wherein a subject matter of the first domain is different than a subject matter of the second domain.

10. A computerized method in which unstructured computer text is analyzed for classification and routing using artificial intelligence transfer learning, the method comprising:
    storing, in a computer data store, a first corpus of unstructured computer text associated with a first domain and a second corpus of unstructured computer text associated with a second domain;
    filtering, by a server computing device in communication with the computer data store, the first corpus of unstructured computer text and the second corpus of unstructured text using natural language processing;
    generating, by the server computing device, a first vocabulary data set based upon the filtered first corpus of unstructured computer text;
    generating, by the server computing device, a second vocabulary data set based upon the filtered second corpus of unstructured computer text;
    generating, by the server computing device, a one-hot vector for each word in the first vocabulary data set and the second vocabulary data set;
    training, using an artificial intelligence neural network executing on the server computing device, a word embedding model using the one-hot vectors of word pairs from the filtered first corpus of unstructured computer text and the filtered second corpus of unstructured computer text;
    creating, by the server computing device, a multidimensional vector for each word in the filtered first corpus of unstructured computer text and the filtered second corpus of unstructured computer text using the trained word embedding model;
    building, by the server computing device, a 3D tensor for the filtered second corpus of unstructured computer text using the trained word embedding model, the 3D tensor comprising a plurality of matrices, wherein each matrix corresponds to a sentence in the filtered second corpus of unstructured computer text and each matrix comprises a plurality of multidimensional vectors, each multidimensional vector corresponding to a word in the sentence;
    applying, by the server computing device, one or more labels to the plurality of matrices in the 3D tensor;
    training, using a recurrent artificial intelligence neural network executing on the server computing device, a long short-term memory model using the plurality of matrices in the 3D tensor and the corresponding labels;
    receiving, by the server computing device, a message comprising one or more sentences of unstructured computer text associated with the second domain from a first client computing device;
    filtering, by the server computing device, the unstructured computer text in the message using natural language processing;
    generating, by the server computing device, a matrix for each sentence in the unstructured computer text in the message by applying the trained word embedding model to each word in the sentence;
    identifies, by the server computing device, one or more labels, and a probability for each label, for each sentence in the unstructured computer text in the message by applying the trained long short-term memory model to the generated matrix for each sentence;
    assigning, by the server computing device, a label having a highest probability to each sentence in the unstructured computer text; and routing, by the server computing device, the message to a second client computing device based upon the assigned label.

11. The method of claim 10, wherein filtering the first corpus of unstructured computer text and the second corpus of unstructured text using natural language processing comprises one or more of: (i) removing stopwords from the first corpus of unstructured computer text and the second corpus of unstructured text, (ii) lemmatizing the first corpus of unstructured computer text and the second corpus of unstructured text, or (iii) removing one or more symbols or digits from the first corpus of unstructured computer text and the second corpus of unstructured text.

12. The method of claim 10, wherein the first corpus of unstructured computer text and the second corpus of unstructured computer text are input into the computer data store via a web page, input directly into the computer data store via a first computer file, input into the computer data store via a data feed, or any combination thereof.

13. The method of claim 10, wherein generating a first vocabulary data set based upon the filtered first corpus of unstructured computer text comprises, for each word in the filtered first corpus of unstructured computer text:

determining a number of times that the word appears in the filtered first corpus of unstructured computer text, and adding the word to a first vocabulary data set if the number of times that the word appears in the filtered first corpus of unstructured computer text is above a predetermined threshold.

14. The method of claim 10, wherein generating a second vocabulary data set based upon the filtered second corpus of unstructured computer text comprises, for each word in the filtered second corpus of unstructured computer text:

determining a number of times that the word appears in the filtered second corpus of unstructured computer text; and adding the word to a second vocabulary data set if the number of times that the word appears in the filtered second corpus of unstructured computer text is above a predetermined threshold.

15. The method of claim 10, wherein the artificial intelligence neural network that trains the word embedding model comprises a shallow neural network having an input layer, a hidden layer, and an output layer.

16. The method of claim 10, wherein the first corpus of unstructured computer text associated with the first domain is larger than the second corpus of unstructured computer text associated with the second domain.

17. The method of claim 10, wherein the one or more labels comprise one or more sublabels.

18. The method of claim 10, wherein a subject matter of the first domain is different than a subject matter of the second domain.

* * * * *